United States Patent [19]

Izura et al.

[11] 4,006,343
[45] Feb. 1, 1977

[54] CODE READ-OUT MEANS

[75] Inventors: Yoshiteru Izura; Masaaki Tanaka, both of Toyonaka; Seishi Sasaki, Hirakata, all of Japan

[73] Assignee: Matsushita Electric Industrial Co., Ltd., Osaka, Japan

[22] Filed: Oct. 21, 1974

[21] Appl. No.: 516,679

[30] Foreign Application Priority Data

| Oct. 23, 1973 | Japan | 48-119588 |
| Oct. 23, 1973 | Japan | 48-119589 |
| Feb. 26, 1974 | Japan | 49-23193 |
| Feb. 26, 1974 | Japan | 49-23194 |
| Mar. 4, 1974 | Japan | 49-25420 |
| Mar. 4, 1974 | Japan | 49-25425 |
| Mar. 4, 1974 | Japan | 49-25433 |
| Mar. 4, 1974 | Japan | 49-25437 |

[52] U.S. Cl. ................ 235/61.11 E; 340/146.3 F; 250/203 R; 235/61.7 R
[51] Int. Cl.² ............ G06K 7/14; G01J 1/20; G06K 9/13
[58] Field of Search ............. 340/149 A, 146.3 F, 340/146.3 K; 235/61.11 E, 61.7 B, 61.7 R; 250/569, 570, 203

[56] References Cited

UNITED STATES PATENTS

| 2,927,216 | 3/1960 | Lohninger | 340/146.3 F7n |
| 3,239,674 | 3/1966 | Aroyan | 250/203 |
| 3,414,731 | 12/1968 | Sperry | 250/569 |
| 3,474,232 | 10/1969 | Hearn | 235/61.11 E |
| 3,480,762 | 11/1969 | Del Vecchio | 235/61.11 E |
| 3,639,729 | 2/1972 | Marshall | 235/61.11 E |
| 3,663,800 | 5/1972 | Myer | 235/61.11 E |
| 3,728,677 | 4/1973 | Munson | 340/146.3 F |
| 3,734,286 | 5/1973 | Simjian | 235/61.11 E |
| 3,812,325 | 5/1974 | Schmidt | 235/61.11 E |
| 3,818,444 | 6/1974 | Connell | 340/146.3 F |
| 3,889,102 | 6/1975 | Dahlquist | 235/61.7 R |

*Primary Examiner*—Daryl W. Cook
*Assistant Examiner*—Robert M. Kilgore
*Attorney, Agent, or Firm*—Stevens, Davis, Miller & Mosher

[57] ABSTRACT

This invention is characterized by apparatus for detecting whether an object having information to be read-out is located in a scanning light beam. Means are provided for starting or stopping operation of the light source, passing or cutting off the light beam by the detected output. The apparatus includes means for converting the light beam emitted from a light source to a scanning light beam by using a deflection means, means for applying the scanning light beam onto the object and means for reading-out the information contained in the object from the light beam reflected by the object.

6 Claims, 20 Drawing Figures

CODE READ-OUT MEANS

This invention is related to an apparatus wherein a code or the like comprised of bars and spaces is optically scanned to provide its read-out output. More specifically, this invention is related to apparatus for detecting whether an object having information to be read-out is located in a scanning light beam. Means are provided for starting or stopping operation of the light source, or passing or cutting off the light beam by the detected output. The apparatus includes means for converting the light beam emitted from a light source to a scanning light beam by using a deflection means, means for applying said scanning light beam onto the object and means for reading-out the information contained in the object from the light beam reflected by the object.

According to this invention, there is provided, code read-out apparatus for reading out a code on a medium attached to an object comprising a lasar beam source, deflecting means receiving the beam from said source and generating a plurality of linear scanning laser beams, a stage, said object being mounted on said stage and movable with respect thereto, said stage being slanted with respect to the horizontal so that the end thereof toward which said object moves is lower than the end at which said object enters said stage, said stage having a plurality of crossed slits therein through which said scanning laser beams may impinge upon said medium, read-out means for receiving light reflected from said medium as a result of the scanning of said medium by said scanning laser beams, detection means for detecting when said object is at a position on said stage where it may be illuminated by said scanning laser beams, and interrupting means controlled by the output of said detection means, said interrupting means cutting off said laser beams when said object is not located at a position on said stage where it may be illuminated by said scanning laser beams.

The further features, objects and advantages of the present invention will be hereinbelow described in conjunction with the following accompanying drawings.

Figure 16:
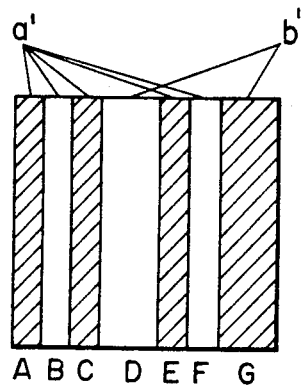
FIG. 16 is a diagram showing a one-character code comprising bars and spaces.

Recently, at supermarkets and other shops the POS terminal has been applied to practical use by printing commodity information such as the kind of article and its price on a price tag in a coded format comprised of bars and spaces. The tag is lead to a slit and optical scanning of the tag is performed at the slit to readout the information. FIG. 16 shows a one-character code which comprises bars and spaces. The bars, and spaces respectively have different widths, the large ones have at least twice the width of the small ones. Therefore, the width of a bar or space may be detected to identify each bit in terms of whether it has a larger or small width. In the diagram on assigning '0' to a narrow bar or space of width $a'$ and 1 to a wide bar or space of width $b'$ respectively the seven bits in FIG. 16 are represented by the combination of (ABCDEFG) = (0001001).

Figure 17:
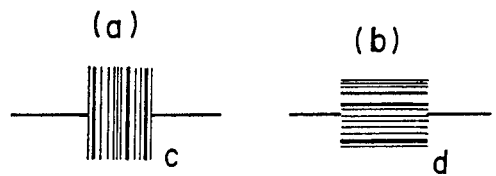
FIG. 17 is a diagram showing a pattern of scanning of the code of FIG. 16.

FIG. 17 shows the pattern obtained in the case where optical scanning is performed along a line to read out the codes shown in FIG. 16. In FIG. 17a the read out is provided by the scanning line $c$. However, in the case of FIG. 17b no read out can be performed by the scanning line $d$. Therefore, in this case the orientation of the tag has to be identified in order to perform the automatic read out of the tag, which makes handling of the tag inconvenient. In order to obviate this disadvantage, circular or semicircular codes printed on the tag have been applied but they have the disadvantage of higher cost in the printing of the codes on the tag.

The object of the present invention is to provide means of starting and stopping optical scanning of an object containing coded information where said object arrives at and moves from a predetermined position respectively in order to prevent exposure of the eyes of the operator of the apparatus and other people to stray light from the scanning light in the case where optical scanning is performed to read out information from the object.

Figure 1:
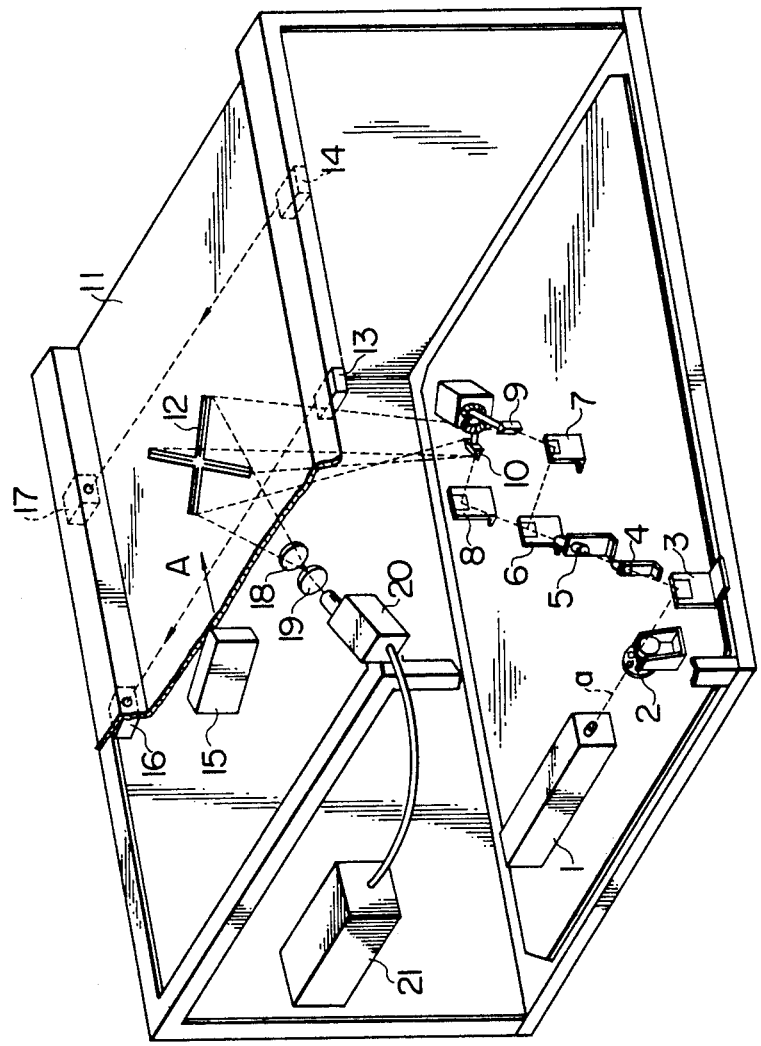
FIG. 1 is a perspective view of a code read out means according to an embodiment of this invention.

An embodiment of the present invention will be described as follows. In FIG. 1, numeral 1 designates a light source which generates a laser light beam $a$, numeral 2 a shutter which is usually closed but opened on reading out a price tag, numeral 3 a reflecting mirror, numerals 4 and 5 light collimating lenses, numeral 6 a half-mirror, numerals 7 and 8 reflecting mirrors which reflect split light from the half-mirror 6, numerals 9 and 10 deflecting mirrors, numeral 11 a partly slanted stage on which articles having price tags travel, numeral 12 an X-shaped slit mounted on the stage 11, numerals 13 and 14 light sources which generate light for detecting an article 15 on the stage 11, numerals 16 and 17 photodetectors which control the opening and shutting of the shutter 2, numerals 18 and 19 lenses which focus the reflected light from the article 15 which is illuminated by the laser light beam $a$, numeral 20 is a light receiver and numeral 21 a discrimination circuit of a read-out code signal.

The laser beam $a$ generated by the light source 1 passes through the shutter 2, is reflected by the reflecting mirror 3, focussed by the lenses 4 and 5 and then enters the half-mirror 6. The light beam reflected at the half mirror 6 and the one transmitted through the half mirror 6 are reflected by the reflecting mirrors 7 and 8 respectively, and deflected by reflecting mirrors rotated by motors; that is, deflecting mirrors 9 and 10 respectively, and then lead to the slit 12. On moving the article 15 in the A direction with its price tag at the bottom of the article the light beam from the light source 13 does not enter the photodetector, which opens the shutter 2 to illuminate the price tag travelling through the slit 12.

This reflected light beam passes through the lenses 18 and 19 and falls on the photoreceiver 20, where it is converted into an electrical signal which is coded from the price tag in the discrimination circuit 21.

The article 15 then travels further and, when the optical path between the light source 14 and photodetector 17 is closed, the shutter 2 is closed again and the whole system waits for the next article. In this way the danger of exposure of the eyes and other portions of the operator's body to the stray laser beam when the apparatus is not operated can be prevented by operation of the shutter 2.

Figure 2:
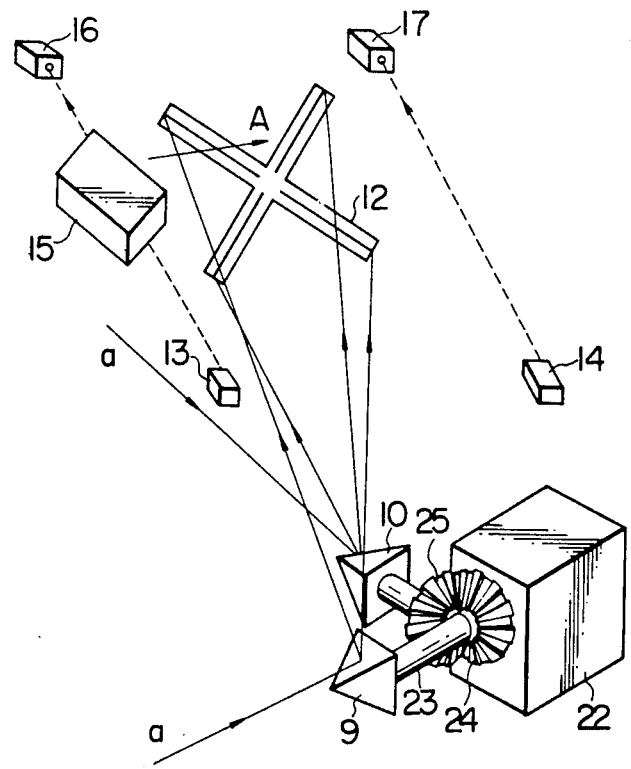
FIG. 2 is a perspective view of a major portion of the code read out means of FIG. 1.

FIG. 2 shows the detailed structure of the driving sector of the deflecting mirrors 9 and 10. One of the deflecting mirrors 9 is fixed on the rotary shaft 23 of a motor 22 and the other deflecting mirror 10 is fixed on a rotary shaft which is driven through the bevel gear 25. The gear 25 is engaged with the bevel gear 24 which is fixed on the rotary shaft 23.

In this way the driving of the deflecting mirrors 9 and 10 by the motor 22 permits the X-shaped scanning by the laser beam $a$.

Figure 3:
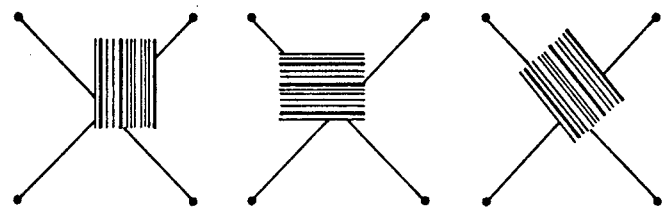
FIG. 3 is a diagram showing the trajectories 15 of the scanning light.

FIG. 3 shows the relationship of the pattern recorded on a price tag versus the X-shaped scanning pattern. As indicated in FIG. 3, achieved for any direction of the pattern on the tag.

By shifting a portion of the crossed portion of the X-shaped scanning pattern a, V-shaped scanning can be made and substantially the same effects as mentioned above can be obtained in the V-shaped scanning.

Figure 4:
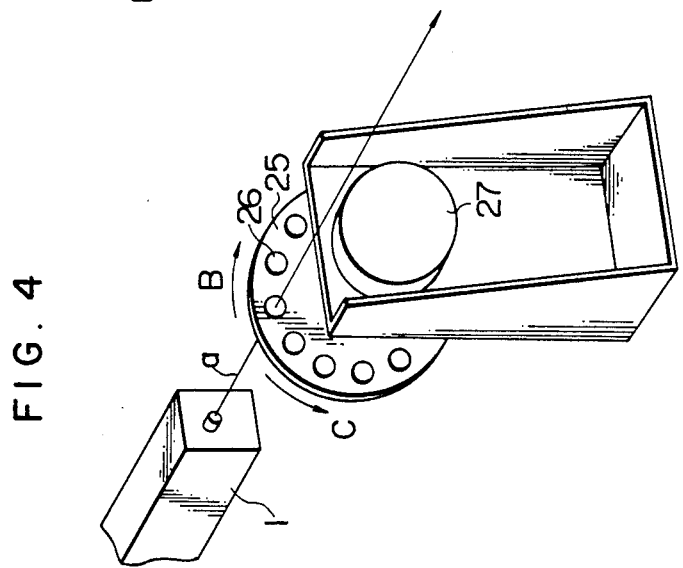
FIG. 4 is a perspective view of a shutter.

FIG. 4 shows the detailed structure of the shutter 2 wherein numeral 25 designates a disc having many holes 26 near its periphery. Numeral 27 designates a stepping motor which rotates the disc 25, the driving of the motor being controlled by the photodetectors 16 and 17 as shown in FIG. 1. In this manner, only when detecting the article 15 at a desired position on the stage 11 is the control action performed by the motor 27 to permit the scanning by the laser beam $a$.

Figure 5:
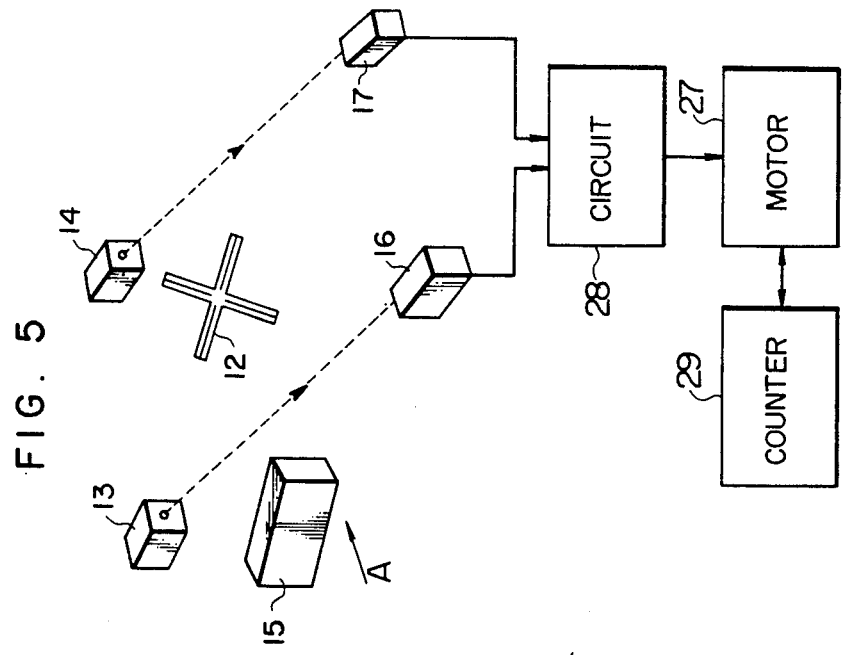
FIG. 5 is a block diagram showing the electrical arrangement of the shutter of FIG. 4.

FIG. 5 shows the driving circuit of the motor 27, wherein the outputs of photodetectors 16 and 17 are compared and discriminated by the circuit 28 and after establishing the position of the article 15 and the motor 27 is driven. Numeral 29 designates a counter.

Although, in this embodiment, straying of the laser light is prevented by means of the shutter 2 which is mounted across the light beam, another arrangement may be conceived of wherein the the light source 1 is switched off in response to the position of the article 15.

An alternative arrangement may be made such that the same performance as that described above is obtained by using only the segments of the article detector designated by the numerals 13, 14 and 16, 17.

Namely it is possible to activate the shutter of laser a light source by the output of a bistable circuit which is set by the output of the photodetector 16 and reset by the signal indicating read-out of the code of the article, or by the output of a resettable monostable circuit.

The arrangement as shown in the following example can also be used for producing a plurality of scanning lines.

Figure 6:
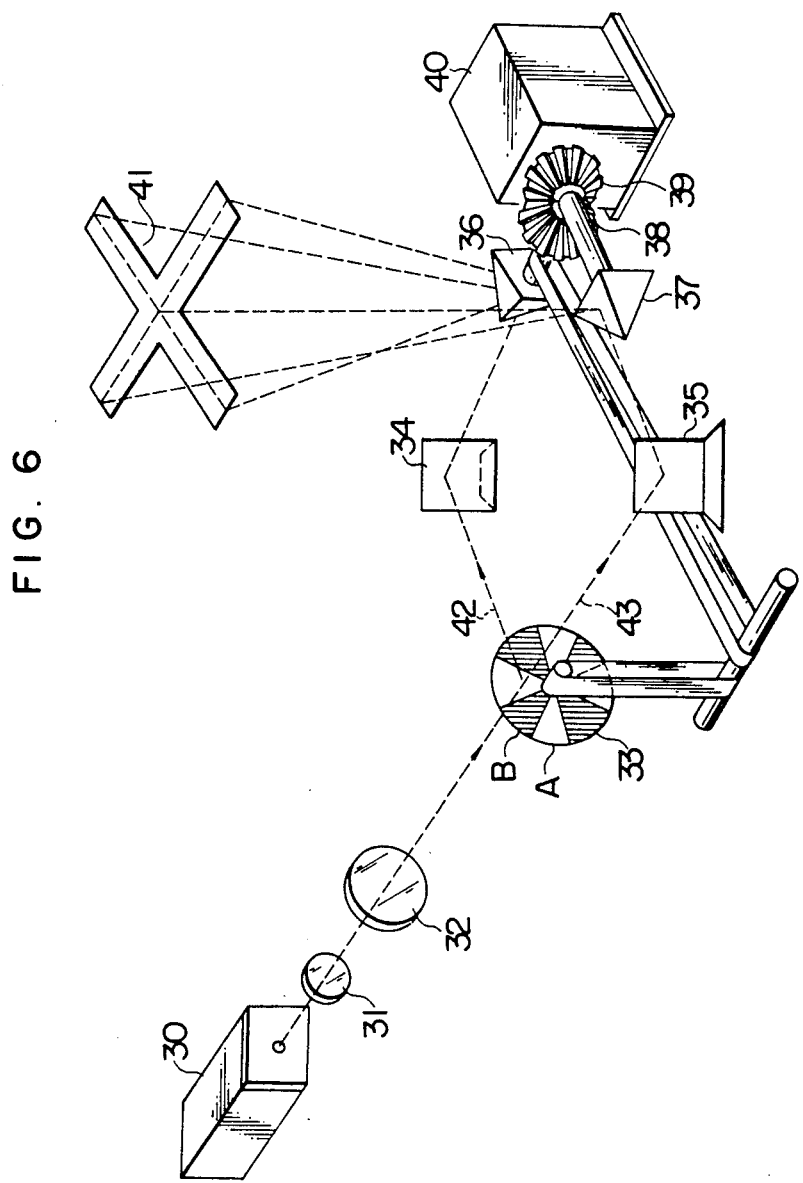
FIG. 6 is a perspective view of a code read out means according to another embodiment of this invention.

In FIG. 6, numeral 30 designates a laser oscillator, 31 and 32 light collimating lens, 33 a light beam splitting rotary mirror in which the segment A is transparent or slit and the segment B is a reflecting mirrors, 34 and 35 fixed reflecting mirror, 36 and 37 rotary mirrors for light beam scanning, 38 and 39 bevel gears, 40 a motor, and 41 an X-shaped slit mounted on a reference plane. Here the function of the rotary mirror 33 will be described as follows. When the scanning mirror 36 is so disposed that the light beam can fall on the X-shaped slit 41 (effective scanning period) the segment B crosses the light beam to lead said beam toward the optical path 42. Then, during the effective scanning period of the scanning mirror 37 which comes after the completion of the above-mentioned scanning the segment A of the rotary mirror 33 crosses the light beam to lead said beam to the optical path 43. The subsequent procedure of the apparatus in FIG. 6 is the same as that of the apparatus shown in FIG. 4. Then, according to the above method, the light beam can be efficiently utilized without reducing the intensity of the light beam by half when it scans the price tag.

Figure 7:
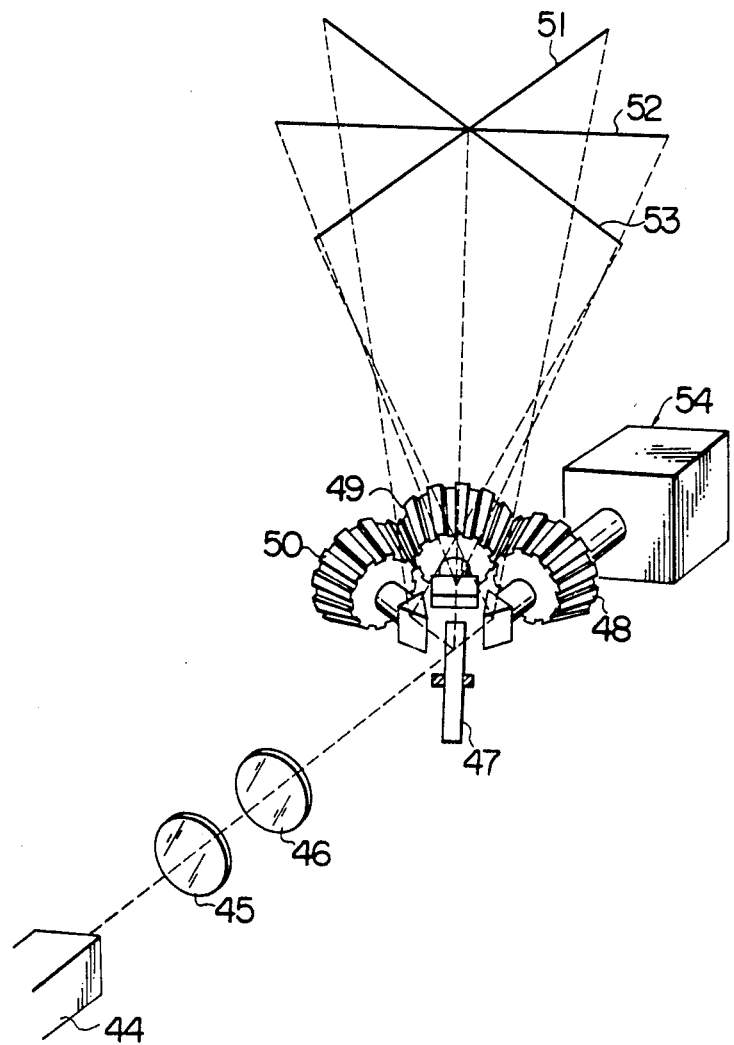
FIG. 7 is a perspective view of a code read out means according to still another embodiment of this invention.
Figure 8A:
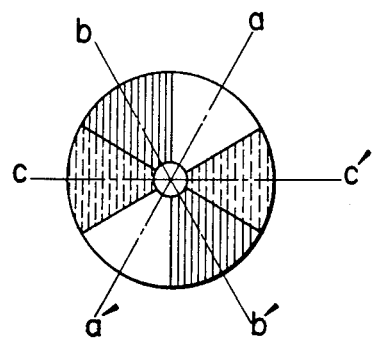
FIGS. 8A through 8D are the diagrams describing a rotating mirror of FIG. 7.
Figure 8B:
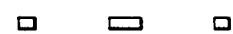
Figure 8C:
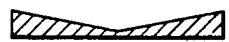
Figure 8D:

Further, with the use of the arrangement shown in FIG. 7, the height of the price tag can be reduced. In FIG. 7 the light beam from the laser oscillator 44 falls on the beam splitting rotary mirror 47 through the collimating optical systems 45 and 46. The mirror 47 then splits the beam into three directions and the split beams generate the patterns 51, 52 and 53 by means of the rotary scanning mirrors 48, 49 and 50 respectively. Here the beam splitting mirror 47 in conjunction with the rotary scanning mirrors 48, 49 and 50 is driven by the motor 54 with the aid of the bevel gear and other means to achieve synchronous rotation.

Figure 9:
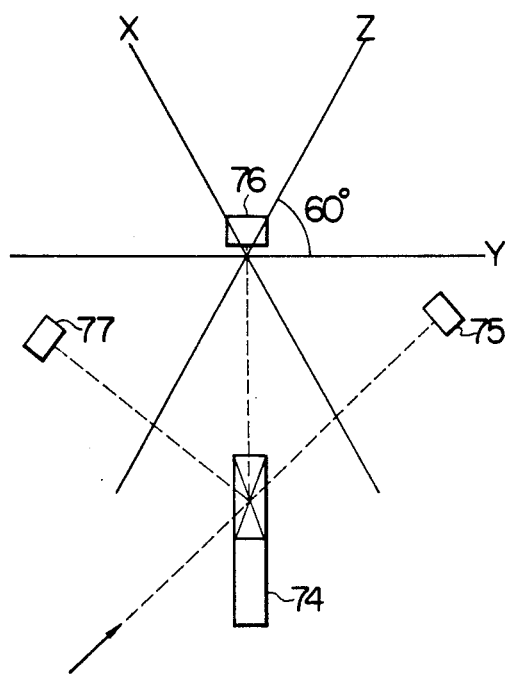
FIG. 9 is a diagram indicating the relative position of a scanning line.
Figure 10:
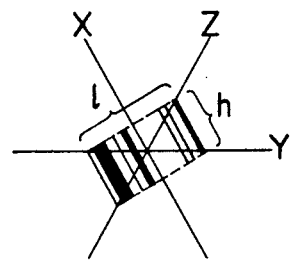
FIG. 10 is a diagram showing a trajectory of the scanning line of FIG. 9.

The structure of the beam splitting rotary mirror 47 is as shown in FIG. 8. FIGS. 8B, 8C and 8D respectively show the cross-sections at $a-a'$, $b-b'$ and $c-c'$ of FIG. 8A. Namely the mirror is so formed that the light beam reflected by the mirror shifts its direction of propagation or the light beam passes through the mirror. FIG. 9 shows the relationship of the relative position of the mirrors 74 to 77 versus scanning light beam X, Y and Z. According to this embodiment the height $h$ of the bar-code may be equal to 1/ 3 of the width (FIG. 10).

However, since the above-mentioned fine scanning by means of a single light source takes much time the system has a disadvantage in that the scanning speed has to be increased to permit scanning of a single scanning line in the same period and this procedure reduces the accuracy of the read-out procedure.

Figure 11:
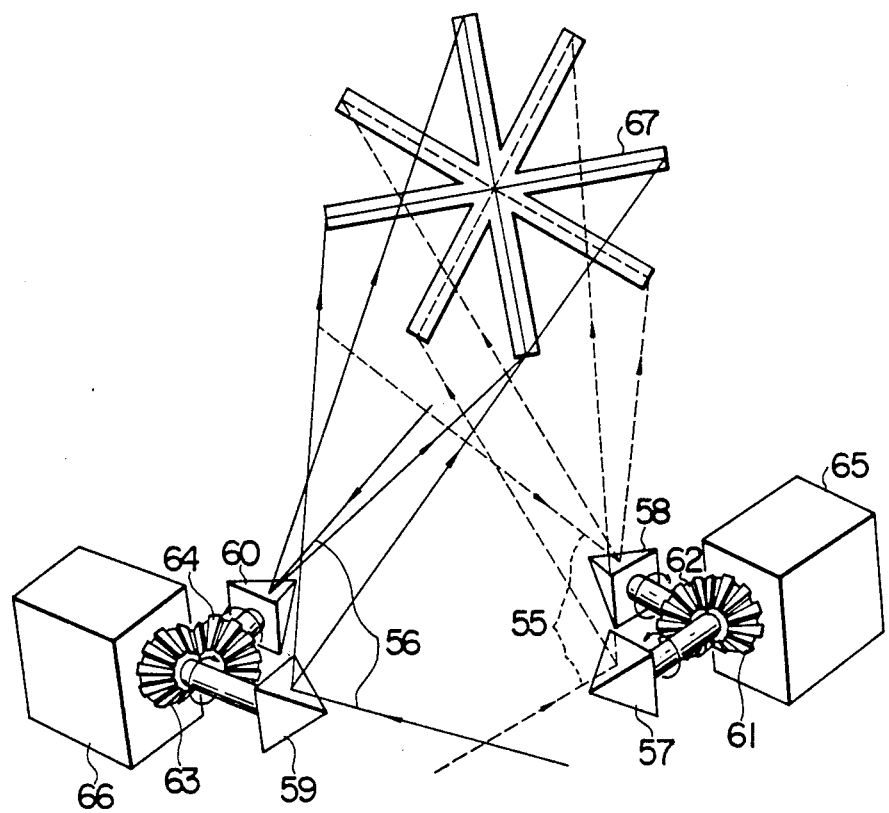
FIG. 11 is a perspective view of a coded read out means according to a further embodiment of this invention.

Another embodiment which eliminates the above-mentioned disadvantage will be described as follows. According to this invention, the bar-coded price tag attached to an article is simultaneously scanned by different wavelengths of laser beams and then the signals from each of the beams can be separately detected by a photodetector whose sensitivity matches any desired wavelength. FIG. 11 shows the major section of the readout means.

Numerals 55 and 56 designate the laser beams of different wavelengths, 57, 58, 59 and 60 quadrangular pyramid-shaped deflecting mirrors, 61 to 64 gears for transmitting rotation, 65 and 66 rotary motors and 67 a slit on a reference plate for * mark-shaped scanning. As shown in the figure, it is possible separately perform * mark-shaped laser beam scanning, to perform X-shaped scanning for each laser beam (in this case two laser beams of different wavelengths) and to separately detect these two laser beams even though both laser beams concurrently enter the * mark-shaped slit 67. Therefore, since this arrangement has the same probability of detection of a scanned article as with X-shaped arrangement shown in FIG. 4, the finer scanning on a reference plate based on the above consideration, in principle, permits reduction of the height of the bar-code.

As seen in the above-mentioned embodiment, according to this invention an object to be read-out is scanned by a plurality of light beams of various wavelengths from different directions and read-out is provided by the conversion of the reflected light into electric signals, which does not necessitate higher scanning speed and thus can provide an accurate read-out procedure.

The stage on which the article is moved shown in FIG. 1 will be described as follows.

Figure 12:
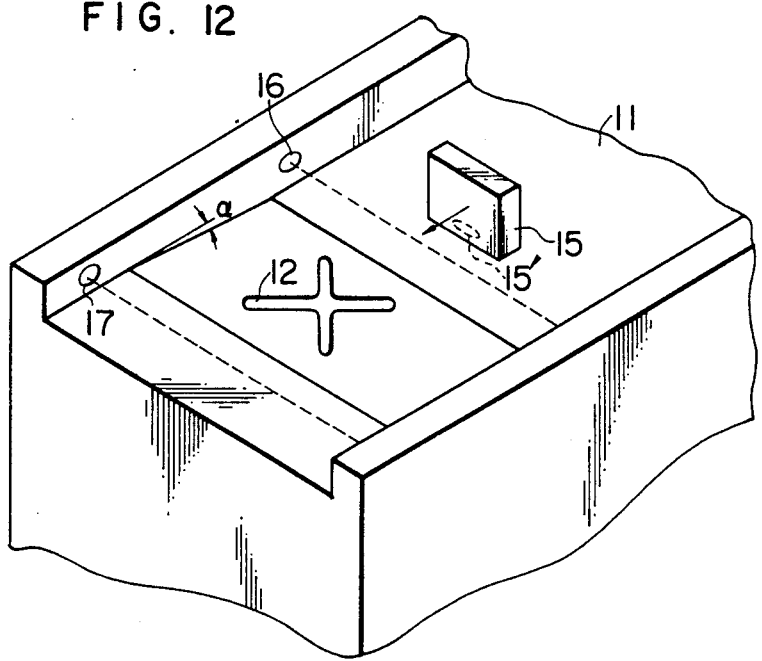
FIG. 12 is a perspective view of a stage of FIG. 1.
Figure 13:
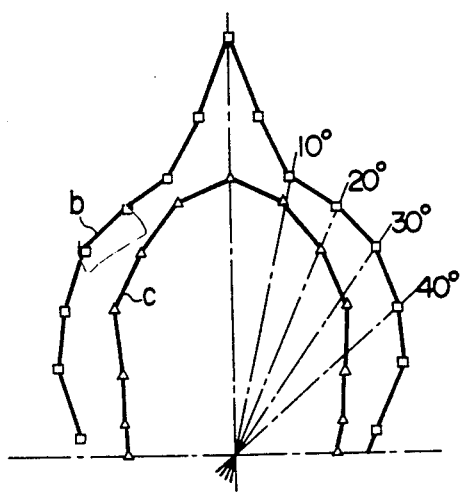
FIG. 13 is a diagram showing the light reflection characteristics of a price tag.

FIG. 12 is a sketch indicating the slanted section of the apparatus which includes the X-shaped slit 12 of reference plane 11. The slanted plane is raised toward the direction A (FIG. 1) in which the article is moving. Namely, on moving the article 15 the arrangement permits close contact with the reference plane 11 of a recorded medium 15' to be read-out such as a price tag which is always attached to the article. FIG. 13 shows the distribution of scattered light indicating the distribution of the intensity of light received by the photodetector 20 versus the incidence angle of the light beam from the deflection mirror 9 against the recorded medium 15'. Experimental data shows that the closer to the center the clearer the image is and 10° to 40° is the most adequate incidence angle. This angle is a measure of the angle of inclination of the reference plane 11.

Curve b of FIG. 13 shows data obtained when employing a paper price tag as a recorded medium 15' and curve c the data when tracing paper is employed.

A detailed description will be made of the inclination of the reference, plane 11.

Figure 14:
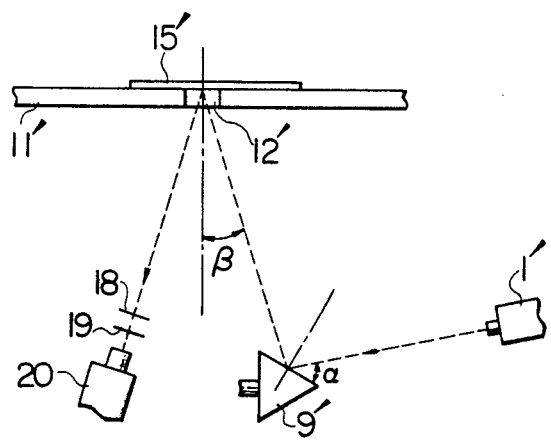
FIG. 14 is a side view of the conventional read out means.
Figure 15:
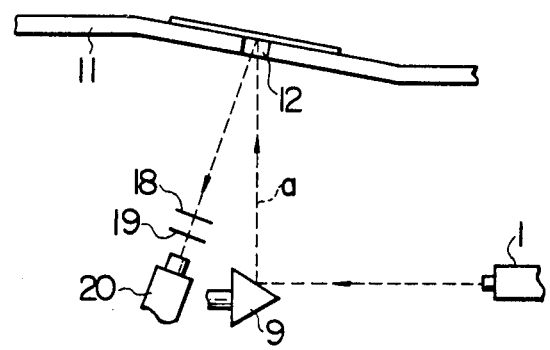
FIG. 15 is a side view of the stage of FIG. 12.

FIG. 14 shows a horizontal reference plane 11' of the conventional apparatus. In this arrangement the light incident on a gap 12' has to make some angle with the perpendicular to the plane 11', which necessitates the making of some incidence angle α of the light beam against the deflecting mirror 9'. This arrangement further needs a slanted light source 1' or the employment of a reflecting mirror, which makes the scanning path of the inner optical system more complicated. On the other hand, in the embodiment shown in FIG. 15 the reference plain 11 is slanted. Therefore, since in this case the deflecting mirror 9 can be mounted on the perpendicular of the slit 12 the light source 1 can be set horizontally against the deflecting mirror 9, which simplifies the internal structure of the arrangement and facilitates the adjustment of the optical path.

Since, according to this invention, a plane on which an object to be read-out is moving is upwardly slanted against the direction of movement of the object a proper angle (10° – 40°) between recorded medium and light beam can be easily obtained. In addition, the simplified attachment of the optical components permits ease of adjustment. Further, since the reference plane is raised in the direction of movement of the object the recorded medium is in close contact with the reference plane, which increases the accuracy of the read-out procedure. Still further, this arrangement, which facilitates the read-out and realization of the information without having any limitation of the orientation of a code comprising bars and spaces, eliminates the identification of the orientation of the code and simplifies the read-out procedure.

Since the scanning light beam is generated only when the object is located on a slit, the employment of a laser beam does not provide any harmful effects on the human body. In addition the employment of the laser beam and the like facilitates the easy distinction between the employed light beam and extraneous light and thus provides an accurate read-out procedure.

What we claim is:

1. Code read-out apparatus for reading out a code on a medium attached to an object comprising:
    a laser beam source,
    a plurality of reflecting mirrors each being separately rotatably mounted,
    a power source for rotating said mirrors,
    a plurality of sequentially interlocked gears interposed between said power source and said mirrors, the beam from said laser beam source impinging on said reflecting mirrors to generate a plurality of scanning laser beams,
    a stage, said object being mounted on said stage and movable with respect thereto, said stage being slanted with respect to the horizontal so that the end thereof toward which said object moves is lower than the end at which said object enters said stage, said stage having a plurality of crossed slits therein through which said scanning laser beams may impinge upon said medium,
    read-out means for receiving light reflected from said medium as a result of the scanning of said medium by said scanning laser beams,
    detection means for detecting when said object is at a position on said stage where it may be illuminated by said scanning laser beams, and
    interrupting means controlled by the output of said detection means, said interrupting means cutting off said laser beams when said object is not located at a position on said stage where it may be illuminated by said scanning laser beams.

2. Code read-out apparatus as defined by claim 1, wherein said laser beam source generates beams of various wavelengths for scanning different respective tracks which run in the different slits, the different wavelengths of reflected light resulting from the scanning of said medium being separated and impinging upon said read-out means.

3. Code read-out apparatus as defined by claim 1, wherein said plurality of reflecting mirrors are polygonal pyramid-shaped mirrors having oblique mirror surfaces.

4. Code read-out apparatus as defined by claim 1, wherein
    said laser beam source comprises:

a single laser beam generating means, and
laser beam splitting means splitting said laser beams into a plurality of laser beams,
and wherein said plurality of reflecting mirrors comprises mutually synchronously rotating rotary mirrors upon which said plurality of laser beams fall thereby generating said plurality of scanning laser beams.

5. Code read-out apparatus as defined by claim 4, wherein said laser beam splitting means comprises a rotatable disc having a plurality of spaced reflecting mirrors mounted thereon, said mirrors being oriented at mutually different angles with respect to the plane of said disc.

6. Code read-out apparatus as defined by claim 1, wherein said interrupting means comprises:
a motor driven by the output of said detection means, and
a disc fixed to the shaft of said motor disposed in the optical path between said laser beam source and said reflecting mirrors, said disc having a plurality of spaced light-transmitting apparatus therein.

* * * * *